United States Patent [19]
Bott

[11] 3,724,547
[45] Apr. 3, 1973

[54] INVERTED LATEX WATER FLOODING METHOD

[75] Inventor: Lawrence L. Bott, Oak Park, Ill.

[73] Assignee: Nalco Chemical Company, Chicago, Ill.

[22] Filed: Jan. 31, 1972

[21] Appl. No.: 222,301

[52] U.S. Cl. .................................. 166/274, 166/275
[51] Int. Cl. ............................................. E21b 43/22
[58] Field of Search .......... 166/274, 275, 273, 305 R; 252/8.55 D

[56] References Cited

UNITED STATES PATENTS

| | | | |
|---|---|---|---|
| 2,827,964 | 3/1958 | Sandiford | 166/274 |
| 3,039,529 | 6/1962 | McKennon | 166/275 |
| 3,070,158 | 12/1962 | Roper et al. | 166/275 |
| 3,149,669 | 9/1964 | Binder, Jr. et al. | 166/274 |
| 3,208,515 | 9/1965 | Meadors | 166/274 |
| 3,294,164 | 12/1966 | Hardy et al. | 166/274 |
| 3,330,348 | 7/1967 | Hardy et al. | 166/274 |
| 3,336,977 | 8/1967 | Amott | 166/274 |
| 3,370,649 | 2/1968 | Wolgemuth | 166/274 |

*Primary Examiner*—Stephen J. Novosad
*Attorney*—John G. Premo et al.

[57] ABSTRACT

An improved water flooding process for recovering oil from a subterranean oil-bearing formation which comprises introducing a water-in-oil emulsion into an input well penetrating the formation. The emulsion contains dispersed therein from 0.01 to 35 percent by weight of a finely-divided water-soluble vinyl addition polymer and which is capable of being inverted in water whereby the water-soluble vinyl addition polymer is released into the water as a solution.

12 Claims, No Drawings

3,724,547

INVERTED LATEX WATER FLOODING METHOD

INTRODUCTION

This invention relates to the secondary recovery of petroleum from subterranean formations, and in particular concerns an improved water flooding process.

The technique of water flooding to recover oil from so-called "depleted" reservoirs is well known. It is described in detail in U.S. Pat. No. 2,827,964. In general, such process consists of introducing an aqueous medium into one or more injection wells which penetrate the "depleted" formation, and forcing such medium through the formation toward one or more production wells which likewise penetrate the formation. In the so-called "five-spot drive", the aqueous medium is forced down four injection wells which are more or less symetrically located around a producing well. As the flooding medium passes through the formation it displaces the residual oil therein and carries it into the producing well from which it is recovered by conventional means. In order to insure that the flooding medium advances through the formation to the production well with a more or less plane front (rather than in the form of fingers extending through the strata of highest permeability) it has been proposed that the viscosity of at least the forward portion of the flooding medium be adjusted so as to be of the order of, or greater than, that of the oil to be recovered. This has been accomplished by adding a viscosity-increasing agent to at least the initial portion of the flooding medium. Fatty acid soaps, alginates, sucrose, glycerine, carboxymethylcellulose and water-soluble polymers such as polyvinyl and polyallyl alcohols have been suggested for use as such agents in aqueous flooding media. Certain of such agents, however, precipitate from solution when exposed to typical reservoir temperatures and/or to the anions or cations normally present in subterranean formations, whereas others must be employed in very large amounts to secure the desired increase in viscosity.

Other materials for increasing the viscosity of the flooding medium have been used. Specifically, water-soluble polymers have been dissolved to increase the viscosity of the flooding medium. For example, the water-soluble partially hydrolyzed acrylamide polymers have been in widespread use as well as the alkyl esters of acrylic and methacrylic acids, methacrylamide, styrene, vinyl acetate, acrylonitrile, methacrylonitrile, vinyl alkyl ethers, vinyl chloride, vinylidene chloride, etc.

Serious drawbacks have been experienced with these polymers in that they have quite slow dissolution times; some as long as 1 hour. Furthermore, as the flooding medium is forced farther along in the formation, it tends to become diluted by water which is found throughout the formation. In addition, the viscosity-increasing additives tend to be lost through adsorption on the reservoir "rock" surface. As a result of this dilution, the blocking or plugging ability of the flooding medium is diminished until at some point in the formation the flooding medium has been so diluted that it no longer blocks the channels at all.

The present invention is based upon the discovery that a water-in-oil emulsion which contains therein a finely-divided water-soluble vinyl addition polymer can be injected into an input well which penetrates the formation, and forcing the water-in-oil emulsion through the formation toward at least one producing well penetrating the formation at a distance from the input well.

This phenomenon is due to the fact that emulsion containing the water-soluble vinyl addition polymer is capable of being inverted in water whereby the water-soluble vinyl addition polymer is released into water as a solution. This results in an uniformly viscous solution throughout the formation without the dilution and adsorption problems of the prior art.

The consequences of this procedure have increased produced oil to water ratios for a certain volume of water sent through the subterranean formation. Thus, the total amount of water needed to be sent through the formation in order to produce equivalent volumes of crude oil will be reduced.

OBJECTS

It is an object of this invention to increase the oil to water ratio in the secondary recovery of oil from subterranean formations.

It also is an object of this invention to provide a water-in-oil emulsion which contains dispersed therein a finely-divided water-soluble vinyl addition polymer which emulsion is capable of being inverted in water whereby the water-soluble vinyl addition polymer is released into water as a solution for recovering petroleum from a subterranean oil-bearing formation.

Further objects will appear hereinafter.

THE INVENTION

This invention relates to a process for recovering oil from a subterranean oil-bearing formation which comprises introducing a water-in-oil emulsion into an input well penetrating said formation and forcing the water-in-oil emulsion through the formation toward at least one producing well penetrating the formation at a distance from the input well. The emulsion contains dispersed therein from 0.01 to 35 percent by weight of a finely-divided water-soluble vinyl addition polymer and is characterized as capable of being inverted in water whereby the water-soluble vinyl addition polymer is released into the water as a solution.

As mentioned above the water-in-oil emulsion is pumped into the input well. Once in the formation and upon contact with the water in the formation the emulsion is inverted and the polymer released into solution.

The water-in-oil emulsion is a polymeric latex concentrate and may be diluted with an organic liquid to yield a less concentrated, more fluid composition.

Generally, the water-in-oil emulsion is injected into the input well by dilution with either water or a brine solution. The brine solution is readily available since it is generally recovered and separated from primary recovery processes.

THE POLYMERIC LATEX CONCENTRATE

The polymeric latex may be prepared by any number of known techniques. The oils used in preparing these emulsions may be selected from a large group of organic liquids which include liquid hydrocarbons and substituted liquid hydrocarbons.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil and Refining Co. under the Tradename "ISOPAR M". Typical specifications of this narrow-cut isoparaffinic solvent are set forth below in TABLE I:

TABLE I

| Specification Properties | Minimum | Maximum | Test Method |
|---|---|---|---|
| Gravity, API at 60/60°F | 48.0 | 51.0 | ASTM D 287 |
| Color, Saybolt | 30 | - | ASTM D 156 |
| Aniline point, °F | 185 | - | ASTM D 611 |
| Sulfur, ppm | - | 10 | ASTM D 1266[1] |
| Distillation, °F | | | ASTM D 86 |
| IBP | 400 | 410 | |
| Dry Point | - | 495 | |
| Flash point,°F (Pensky-Martens closed cup) | 160 | - | ASTM D 93 |

[1]Nephelometric mod.

The amount of oil used in relation to the water to prepare the emulsion may be varied over wide ranges. As a general rule, the amount of oil-to-water may vary between 5:1 to 1:10 with preferable emulsions being prepared in the ratio of 1:2 to 1:10. These ratios are illustrative of emulsions that can be prepared, although it should be understood that the invention is not limited thereby.

The emulsions may be prepared by any number of techniques. For example, the emulsions may be prepared by using high speed agitation or ultrasonic techniques. In most instances, however, it is desirable that the emulsion be a stable emulsion and to achieve this end it is often necessary to employ an oil-soluble emulsifying agent. The amount of emulsifying agent to provide an emulsion will have to be determined by routine experimentation. As a general rule it may be said that the amount of oil-soluble emulsifier may range from 0.1 to 30 percent by weight based on the weight of the oil. To produce stable emulsions the amount of emulsifier will normally be within the range of 12 to 20 percent by weight of the oil.

Rather than provide a listing of suitable emulsifiers, it is preferred to generally recommend as being satisfactory the so-called low HLB materials which are well documented in the literature and are summarized in the Atlas HLB Surfactant Selector. Although these emulsifiers are useful in producing good water-in-oil emulsions, other surfactants may be used as long as they are capable of producing these emulsions. For instance, it has been found that certain high HLB surfactants are capable of producing stable water-in-oil emulsions. A typical low HLB emulsifier is sorbitan monooleate.

DISPERSING THE POLYMERS INTO THE WATER-IN-OIL EMULSIONS

In accordance with the first step or procedure of the invention, the water-soluble vinyl addition polymers are dispersed into the water-in-oil emulsion. The polymers as produced by most manufacturing processes are in the form of powders or lump-like agglomerates of varying particle size. It is desirable that the particles, before being placed into the emulsion, be comminuted by grinding, abrading or the like so that their average particle size is less than 5 millimeters and preferably is within the range of 1 to 5 microns. After the powders have been comminuted, they may be dispersed into the water-in-oil emulsion by means of agitation provided by such devices as stirrers, shakers, homogenizers and the like. To be commercially practical, the amount of polymer in the emulsion should be at least 2 percent by weight. The invention contemplates using emulsions containing between 5 to 75 percent by weight with preferred emulsions having a polymer concentration within the range of 10 to 45 percent by weight. In some cases the starting emulsions are converted to suspensions due to the nature and the amount of the polymer present therein.

The method of preparing a water-in-oil emulsion by the use of a homogenization device is quite simple. Water is added with agitation to an oil-emulsifier mixture to make an emulsion. The finely-divided polymer particles are then added to the emulsion with rapid agitation. The particle size of the polymer should be within the range of 1 micron to about 5 microns. This suspension of polymer particles in the emulsion is passed through a homogenizer. The amount of pressure necessary to produce a smooth emulsion varies in each experiment. The minimum pressure requirement is a function of the abrasiveness of the polymer, the concentration of the polymer and the particle size of the polymer. In general, the pressure requirement is between 1,000 to 3,000 psi. However, depending upon those variables listed, the pressure requirement could be lower or exceed the stated range. A typical homogenizer device is the Manton-Gaulin type.

From a commercial standpoint it is beneficial that the polymer emulsions thus described be stable, yet at the same time contain relatively large amounts of polymers. One method of insuring that the polymers do not precipitate when dispersed in the emulsion is that the particle size of the polymer be as small as possible. Thus polymers dispersed in the emulsifiers are quite stable when the particle size is within the range of 5 millimicrons up to about 5 microns. To produce particle sizes within these limitations, spray dryers with appropriate size nozzles may be used. It also is possible to prepare the polymer-containing emulsion of the water-soluble vinyl addition polymers directly from the vinyl monomers from which these polymers are synthesized. Such polymer-containing emulsion may be synthesized by using the water-in-oil emulsion polymerization technique set forth in U.S. Pat. No. 3,284,393. The teachings of this patent comprise forming a water-in-oil emulsion of water-soluble ethylenic unsaturated monomers. The emulsion is formed by utilizing a water-in-oil emulsifying agent. To this monomer is added a free radical-type polymerization catalyst and then heat is applied under free radical-forming conditions to form water-soluble polymer latices. The polymeric latex concentrates produced by this patent are relatively unstable and frequently must be treated with additional emulsifiers to render the products stable.

THE WATER-SOLUBLE VINYL ADDITION POLYMERS

These polymers are well known to the art and have been described in numerous publications and patents. The polymers most commonly used in many industrial applications are acrylamide polymers which include polyacrylamide and its water-soluble copolymeric derivatives such as, for instance, acrylamide-acrylic acid, and acrylamide-acrylic acid salt copolymers which contain from about 95 to 5 percent by weight of acrylamide. Also useful are copolymers of acrylamide with other vinyl monomers such as maleic anhydride, acrylonitrile, styrene and the like. It is preferred in the practice of this invention to use acrylamide polymers which are water-soluble and which contain at least 5 percent by weight of acrylamide.

A preferred water-soluble vinyl addition polymer of this invention is polyacrylamide. Another preferred polymer is a copolymer of acrylamide and acrylic acid wherein the acrylic acid component is from 0.8 to 70 percent by weight and the acrylamide component is from 30 to 99.2 percent by weight. The preferred ratio is 65:35. Also preferred is a copolymer of acrylamide-methacrylic acid having a ratio of 93:7, or a copolymer of acrylamide-dimethylaminoethyl methacrylate (D-MAEM) having a ratio of 75:25.

Other water-soluble vinyl polymers are described in detail in the following U.S. Patents: 3,418,237; 3,259,570 and 3,171,505.

In examining the disclosures of these patents it will be seen that the water-soluble polymers may be either cationic or anionic and, in some instances, the ionic charges are sufficiently slight so that the polymers may be considered as nonionic.

For example, water-soluble polymers and copolymers of allyl, diallyl amines, or dimethylaminoethyl methacrylate are cationic. Polymers such as polyvinyl alcohol are nonionic, and polymers such as polyacrylic acid or polystyrene sulfonates are anionic. All of these polymers may be used in the practice of the invention.

The molecular weight of the polymers described above may vary over a wide range, e.g., 10,000 to 25,000,000. The invention, however, finds its greatest usefulness in preparing aqueous solutions or dispersions of these polymers and, in particular, acrylamide polymers whose molecular weight are in excess of 1,000,000. Polymers having higher molecular weights are more difficultly dissolved in water and tend to form extremely viscous solutions at relatively low concentrations. Also, the polymers may be produced by any known methods of conducting polymerization reactions. Thus, solution suspension or emulsion polymerization techniques may be used.

THE ORGANIC LIQUID

Generally, the polymeric latex concentrate will be diluted with an organic liquid just prior to use. As mentioned above, the preferred polymeric latex concentration will have from 20 to 50 percent by weight of a water-soluble vinyl addition polymer. In this application, the polymeric latex concentrate will be diluted with the organic liquid so that the water-in-oil emulsion will have 0.1 to 10 percent by weight of the water-soluble vinyl addition polymer.

The polymeric latex concentrate can be diluted with the organic liquid (including crude oil) near the location of the well where it is to be used. This on-site dilution procedure may be performed in a mixing tank near the well location and then be pumped directly into the well. The organic liquids of this invention include both aromatic and aliphatic hydrocarbon compounds. Thus, such organic hydrocarbon liquids as benzene, xylene, toluene, mineral oils, kerosene, naphthas and petroleums may be used. In particular, the petroleum recovered from the primary recovery operation (crude oil) may be used to dilute the polymeric latex concentrate for use. The use of petroleum obtained from the primary recovery operation eliminates the burdensome problems in handling other organic liquids but also results in a great decrease in cost.

Oftentimes it is desirable to use a more concentrated flooding medium than the one as defined above. If such is the case the polymeric latex concentrate may be used without dilution with an organic liquid. If such is the case the polymeric latex concentrate would be pumped directly into the well without any type of dilution.

In general the polymeric latex concentrate will have a composition as follows:

A. water ranging between 5 and 25 percent by weight;
B. a water-soluble vinyl addition polymer having a concentration between 20 and 50 percent by weight;
C. a hydrophobic liquid ranging between 5 and 35 percent by weight;
D. a water-in-oil emulsifying agent having a concentration between 0.1 and 30 percent by weight.

The polymeric latex upon dilution will have a composition as follows:

A. water ranging between 0.1 and 25 percent by weight;
B. a water-soluble vinyl addition polymer having a concentration between 0.1 and 35 percent by weight;
C. a hydrophobic liquid ranging between 5 and 99 percent by weight;
D. a water-in-oil emulsifying agent having a concentration between 0.001 and 30 percent by weight.

INVERTING THE FLOODING MEDIUM

The major discovery upon which this invention is predicated is the discovery that when the water-in-oil emulsion of the type described is inverted in the presence of water in the subterranean formation, the polymer goes into aqueous solution forming an uniformly viscous solution in the formation. The polymer-containing emulsions release the polymer in water after a period of time in such a manner as to avoid the dissolution problem of the prior art. Thus, when the water-in-oil emulsion is pumped into an input well it will mix with water in the subterranean formation at which time the polymer will be released forming a viscous polymeric solution.

Oftentimes it is convenient to add a surfactant to the flooding medium. The surfactant may be combined with the water-in-oil emulsion by several different techniques. It may be added and mixed with the water-in-oil emulsion just prior to being pumped into the subterranean formation. The placement of a surfactant into the flooding medium causes the emulsion to more rapidly invert and release the polymer in the form of an aqueous solution. When this technique is used to invert the flooding medium the amount of surfactant present in the water may vary over a range of from 0.01 to 10 percent based on polymer.

Secondly, the surfactant may be introduced as a solution into the subterranean formation prior to the injection of the water-in-oil emulsion. The surfactant may be diluted with a brine which was recovered and separated from primary recovery processes. This brine solution is readily available at little or no cost. The surfactant is added to the brine solution in a concentration from 0.5 to 5.0 percent by weight. When the crude oil containing the water-in-oil emulsion is contacted with the brine containing surfactant in the subterranean formation the emulsion is inverted and the polymer goes into solution forming an uniformly viscous solution in the formation. The rate at which this occurs may be controlled by the type and amount of emulsifier used to prepare the polymer system. The polymer-containing emulsions release the polymer in water after a period of time in such a manner as to avoid the dissolution problem of the prior art. Thus, when the water-in-oil emulsion is pumped into an input well it will mix with water in the subterranean formation at which time the polymer will be released forming a viscous polymeric solution.

It is preferred that once the crude oil containing the emulsion is introduced into the formation that the emulsion be left static for from 5 to 72 hours. This period of time has been found to be sufficient to completely invert the emulsion and release the water-soluble vinyl addition polymer into solution. As mentioned above, this time may vary with the composition as well as the rock formation. Thus, it is possible for complete dissolution to occur either more rapidly or more slowly than the preferred time range. It should be stressed that the invention is not limited by the amount of time necessary to dissolve the polymer.

The process of this invention comprises the following steps:

A. introducing a brine solution containing from 0.5 to 5.0 percent by weight of a surfactant into an input well which penetrates said formation; then;

B. introducing a water-in-oil emulsion into said input well which penetrates said formation, and allowing the water-in-oil emulsion to be left static for from 5 to 72 hours; said emulsion containing dispersed therein from 0.01 to 35 percent by weight of a finely-divided water-soluble vinyl addition polymer and which is capable of being inverted in water whereby the water-soluble vinyl addition polymer is released into the water as a solution, then forcing said solution through said formation toward at least one producing well penetrating said formation at a distance from said input well.

Thirdly, the water-in-oil emulsion may be injected into the subterranean formation, followed by the injection of the brine solution containing the surfactant.

THE SURFACTANTS

The preferred surfactants are hydrophylic and are further characterized as being water-soluble. Any hydrophilic-type surfactant such as ethoxylated nonyl phenols, ethoxylated nonyl phenol formaldehyde resin, dioctyl esters of sodium sulfosiccinate, and octyl phenol polyethoxyethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride, and stearyl amine hydrobromide.

Any anionic, cationic, or nonionic compound can be used as a surfactant.

Following is a list of suitable surfactants that could be used in the practice of this invention. Any water-soluble surfactant could be used, but naturally some are more efficient than others. Useful surfactants include, but are not limited to: polyoxyethylene alkyl phenol, polyoxyethylene (10 mole) cetyl ether, polyoxyethylene alkyl-aryl ether, polyoxyethylene monolaurate, polyoxyethylene vegetable oil, polyoxyethylene sorbitan monolaurate, polyoxyethylene esters or mixed fatty and resin acids, polyoxyethylene sorbitol lanolin derivative, polyoxyethylene (12 mole) tridecyl ether, polyoxyethylene sorbitan esters of mixed fatty and resin acids, polyoxyethylene sorbitan monostearate, polyoxyethylene sorbitan monooleate, polyoxyethylene monostearate, polyoxyethylene (20 mole) stearyl ether, polyoxyethylene (20 mole) oleyl ether, polyoxyethylene (15 mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, quaternary ammonium derivative, potassium oleate, N-cetyl N-ethyl morpholinium ethosulfate, and pure sodium lauryl sulfate.

In addition to using the water-soluble surfactants described above, other surfactants may be used such as silicones, clays and the like which are included as surfactants since, in certain instances, they tend to invert the emulsion even though they are not water-soluble.

In other specific cases the surfactant may be directly added to the polymer-containing emulsion; thereby rendering it self-inverting upon contact with water. These products, while capable of being used in certain systems, must be carefully formulated since the surfactants may tend to interact with the emulsifier or the emulsion and destroy it prior to its being used.

Other techniques for inverting the emulsions include the use of agitation, heat and pH shift, as well as the placement into the water, into which the polymer-containing emulsion is to be dissolved, certain electrolytes. For any particular polymer-containing emulsion a suitable method for its inversion may be readily determined by routine experimentation.

EXAMPLES

When the water-in-oil emulsions are injected into input wells they have a high water to oil output ratio, generally resulting from many years of secondary recovery operations, it is possible to greatly improve the amount of oil produced in relation to the water recovered.

For instance, when the water-in-oil emulsions would be used to treat typical produced fluid from, for instance, a West Texas water flooding field improvements in the amount of oil produced will range from between 10 to as high as 40 percent by weight as compared to a solution of a comparable dry polymer.

Specifically, when the water-in-oil emulsions of the invention are used typical results that would be obtained are set forth in Table II below. Typical of the dilutions used are injection fluid which is composed of 95 percent crude oil, 4 percent water, 1 percent polymer. The results shown in Table II would be obtained after continuous injection would be made into the producing wells over a 1–5 week period.

TABLE II

| Example No. | Water, percent by wt. | Oil, percent by wt. | Polymer | Percent in emulsion | Percent increase in oil compared to dry polymer |
|---|---|---|---|---|---|
| 1 | 72 | 28(T) | Acrylamide | 35 | 32 |
| 2 | 72 | 28(I) | {93% acrylamide, 7% methacrylic acid} | 35 | 37 |
| 3 | 72 | 28(T) | {65% acrylamide, 35% acrylic acid} | 35 | 40 |
| 4 | 67 | 33(I) | {75% acrylamide, 25% DMAEM} | 30 | 20 |
| 5 | 48 | 52(I) | Sodium polyacrylate | 37 | 20 |
| 6 | 42 | 58(I) | DMAEM | 24 | 15 |
| 7 | 42 | 58(I) | Polystyrene sulfonate | 24 | 18 |

NOTE.—I=Isopar M. T=Toluene. DMAEM=Dimethyl Aminoethyl Methacrylate.

I claim:

1. A process for recovering oil from a subterranean oil-bearing formation which comprises introducing a water-in-oil emulsion into an input well penetrating said formation and forcing said water-in-oil emulsion through said formation toward at least one producing well penetrating said formation at a distance from said input well, said emulsion containing dispersed therein from 0.01 to 35 percent by weight of a finely-divided water-soluble vinyl addition polymer and which is capable of being inverted in water whereby the water-soluble vinyl addition polymer is released into the water as a solution.

2. The process of claim 1 wherein the water-in-oil emulsion is comprised of:
   A. water ranging between 0.01 and 25 percent by weight;
   B. a water-soluble vinyl addition polymer having a concentration between 0.1 and 35 percent by weight;
   C. a hydrophobic liquid ranging between 5 and 99 percent by weight; and
   D. a water-in-oil emulsifying agent having a concentration between 0.001 and 30 percent by weight.

3. The process of claim 1 wherein the water-in-oil emulsion is comprised of:
   A. water ranging between 5 and 25 percent by weight;
   B. a water-soluble vinyl addition polymer having a concentration between 20 and 50 percent by weight;
   C. a hydrophobic liquid ranging between 5 and 35 percent by weight; and
   D. a water-in-oil emulsifying agent having a concentration between 0.1 and 30 percent by weight.

4. The process of claim 1 wherein the concentration of the water-soluble vinyl addition polymer in the polymeric latex is from 0.1 to 10 percent by weight.

5. The process of claim 1 wherein the polymer is an acrylamide-sodium acrylate copolymer.

6. The process of claim 5 wherein the weight ratio of acrylamide to sodium acrylate is 65:35.

7. The process of claim 1 wherein the polymer is polyacrylamide.

8. The process of claim 1 wherein the polymer is an acrylamide-methacrylic acid copolymer.

9. The process of claim 1 wherein the polymer is an acrylamide-sodium acrylate copolymer wherein the acrylic acid component is from 0.8 to 70 percent by weight and the acrylamide component is from 30 to 99.2 percent by weight.

10. A process for recovering oil from a subterranean oil-bearing formation which comprises introducing a water-in-oil emulsion in the presence of a water-soluble surfactant into an input well penetrating said formation and forcing said water-in-oil emulsion through said formation toward at least one producing well penetrating said formation at a distance from said input well, said emulsion containing dispersed therein from 0.01 to 35 percent by weight of a finely-divided water-soluble vinyl addition polymer and which is capable of being inverted in water whereby the water-soluble vinyl addition polymer is released into the water as a solution.

11. A process for recovering oil from a subterranean oil-bearing formation which comprises the following steps:
   A. introducing a brine solution containing from 0.5 to 5.0 percent by weight of a surfactant into an input well which penetrates said formation; then;
   B. introducing a water-in-oil emulsion into said input well which penetrates said formation, and allowing the water-in-oil emulsion to be left static for from 5 to 72 hours; said emulsion containing dispersed therein from 0.01 to 35 percent by weight of a finely-divided water-soluble vinyl addition polymer and which is capable of being inverted in water whereby the water-soluble vinyl addition polymer is released into the water as a solution; and
   C. then forcing said solution through said formation toward at least one producing well penetrating said formation at a distance from said input well.

12. The process of claim 11 wherein the water-in-oil emulsion is comprised of:
   A. water ranging between 0.01 and 25 percent by weight;

B. a water-soluble vinyl addition polymer having a concentration between 0.1 and 35 percent by weight;
C. a hydrophobic liquid ranging between 5 and 99 percent by weight; and
D. a water-in-oil emulsifying agent having a concentration between 0.001 and 30 percent by weight.

* * * * *